US012411688B2

(12) United States Patent
Fernsler et al.

(10) Patent No.: US 12,411,688 B2
(45) Date of Patent: *Sep. 9, 2025

(54) GATHER BUFFER MANAGEMENT FOR UNALIGNED AND GATHER LOAD OPERATIONS

(71) Applicant: International Business Machines Corporation, Armonk, NY (US)

(72) Inventors: Kimberly M. Fernsler, Cedar Park, TX (US); Bryan Lloyd, Austin, TX (US); David A. Hrusecky, Cedar Park, TX (US); David Campbell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/225,911

(22) Filed: Jul. 25, 2023

(65) Prior Publication Data
US 2023/0367595 A1    Nov. 16, 2023

Related U.S. Application Data

(63) Continuation of application No. 17/462,620, filed on Aug. 31, 2021, now Pat. No. 11,755,324.

(51) Int. Cl.
*G06F 9/30* (2018.01)
*G06F 9/38* (2018.01)

(52) U.S. Cl.
CPC ...... *G06F 9/30043* (2013.01); *G06F 9/30036* (2013.01); *G06F 9/3858* (2023.08)

(58) Field of Classification Search
None
See application file for complete search history.

(56) References Cited

U.S. PATENT DOCUMENTS 5,752,273 A * 5/1998 Nemirovsky ........... G06F 9/355
                                                   711/219
6,061,779 A * 5/2000 Garde ................. G06F 9/30043
                                                  712/E9.033

(Continued)

OTHER PUBLICATIONS

Pritchard, et al., "Optimizing MPI Collectives for X1", Sep. 2004, pp. 1-10, CUG 2004 Proceedings.

(Continued)

*Primary Examiner* — Keith E Vicary
(74) *Attorney, Agent, or Firm* — Scully, Scott, Murphy & Presser, P.C.; Teddi Maranzano

(57) ABSTRACT

A computer system, processor, programming instructions and/or method for managing operations of a gather buffer for a processor core load storage unit. The processor core includes a processing pipeline having one or more execution units for processing unaligned load instructions that executes in two phases to satisfy. A buffer storage element is provided having a plurality of entries for temporarily collecting partial writeback results retrieved from the memory that are associated with first phase accesses for each of a plurality of unaligned load instructions. An associated logic controller device tracks two parts of the unaligned load to be gathered at independent times, wherein said partial result stored at said buffer storage element comprises a first part of an unaligned load. The second phase load access for the same instruction is independently accessed and later merged with first part of the load data at byte granularity to satisfy the load.

18 Claims, 9 Drawing Sheets

(56) References Cited

U.S. PATENT DOCUMENTS

| | | | | |
|---|---|---|---|---|
| 6,112,297 | A * | 8/2000 | Ray | G06F 9/3824 |
| | | | | 712/225 |
| 6,449,706 | B1 * | 9/2002 | Chen | G06F 9/3816 |
| | | | | 712/E9.034 |
| 6,539,467 | B1 * | 3/2003 | Anderson | G06F 9/30109 |
| | | | | 711/149 |
| 6,704,854 | B1 * | 3/2004 | Meier | G06F 9/3885 |
| | | | | 712/216 |
| 8,635,431 | B2 | 1/2014 | Citron et al. | |
| 10,503,506 | B2 | 12/2019 | Batley | |
| 10,579,524 | B1 | 3/2020 | Mattina et al. | |
| 11,755,324 | B2 * | 9/2023 | Fernsler | G06F 9/30036 |
| | | | | 712/225 |
| 2003/0120889 | A1 * | 6/2003 | Roussel | G06F 9/30043 |
| | | | | 711/201 |
| 2005/0138343 | A1 * | 6/2005 | Liang | G06F 9/30018 |
| | | | | 712/E9.046 |
| 2006/0010304 | A1 * | 1/2006 | Homewood | G06F 9/30032 |
| | | | | 712/E9.034 |
| 2006/0259746 | A1 * | 11/2006 | Kunie | G06F 9/30032 |
| | | | | 712/225 |
| 2007/0106883 | A1 * | 5/2007 | Choquette | G06F 9/383 |
| | | | | 712/225 |
| 2007/0156990 | A1 * | 7/2007 | Hammarlund | G06F 9/30032 |
| | | | | 711/167 |
| 2012/0047311 | A1 * | 2/2012 | Sheaffer | G06F 12/0855 |
| | | | | 711/3 |
| 2012/0151156 | A1 * | 6/2012 | Citron | G06F 9/30036 |
| | | | | 711/E12.001 |
| 2013/0007381 | A1 * | 1/2013 | Palmer | G06F 12/0246 |
| | | | | 711/E12.001 |
| 2017/0109165 | A1 * | 4/2017 | Batley | G06F 9/30145 |
| 2018/0300134 | A1 * | 10/2018 | Di | G06F 12/0875 |
| 2019/0138308 | A1 * | 5/2019 | Robinson | G06F 9/30105 |
| 2021/0089305 | A1 * | 3/2021 | Lu | G06F 9/30043 |

OTHER PUBLICATIONS

Pfefferle, et al., "NVMf based Integration of non-volatile Memory in a Distributed System—Lesson learned", Apr. 2018, pp. 1-22, Open Fabrics Alliance, 14th Annual Workshop, IBM Zurich Research.
Yoshida, Toshio, "Fujitsu High Performance CPU for the Post-K Computer", Aug. 21, 2018, pp. 1-22, Fujitsu Limited.
ip.com: "Solution for Keeping chain of Responsibility's Members Independent", Anonymously; Feb. 10, 2011, pp. 1-3.
ip.com: "Fast Distributed History Buffer Restore of Partially Written Data to a GPR in a Multislice Microprocessor", Anonymously; Jun. 26, 2017, pp. 1-6.
ip.com: "Dynamically Manage DMA Scatter Gather Buffers", Anonymously; Mar. 5, 2013, pp. 1-3.
IBM: List of IBM Patents or Patent Appplications Treated as Related, Jul. 25, 2023, 2 pages.
Fernsler, et al., Pending U.S. Appl. No. 17/462,620, filed Aug. 31, 2021, titled "Gather Buffer Management for Unaligned and Gather Load Operations", 36 pages.

* cited by examiner

… (1)

GATHER BUFFER MANAGEMENT FOR UNALIGNED AND GATHER LOAD OPERATIONS

BACKGROUND

The present invention generally relates to data processing systems, processors, and processor architecture, and methods of processing data instructions, and more particularly to a gather buffer management system and method for unaligned and gather load operations.

Processors currently used in data processing systems process more than one instruction at a time, and often perform load operations to copy data from a main memory or cache into a register and store operations to copy data from a register into a cache or main memory. In modern computer architecture, the capability exists to process "unaligned" load operations, i.e., those load operations that cross particular memory boundaries. Currently, when processing these "unaligned" load operations, not all of the bytes of data are able to be retrieved in one memory access. In some processors, unaligned loads get sent to microcode to be handled, causing slower performance of these operations. Other implementations to handle unaligned loads involve attempting to do the two memory accesses inline back to back or with a fixed timing delay. These approaches help with the performance but are rigid and lack flexibility.

SUMMARY

The summary of the disclosure is given to aid understanding of a computer system, computer architectural structure, processor, processor architecture structure, register files, and methods and logic implemented for managing the gathering of load instruction data for unaligned loads at an execution unit in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, processor architecture structure, register files, execution units and/or their method/logic of operation to achieve different effects.

A computer system, processor, and/or method for processing information is disclosed for handling unaligned load operations in a load/store unit of a processor. In an aspect, the system, processor and/or method is directed to managing a gather buffer for unaligned and gather load operations at independent and arbitrarily spaced times.

In accordance with one aspect, there is provided a system for processing information in a processor. The system comprises: a processing pipeline having one or more execution units for processing unaligned load instructions; a memory for storing data retrieved by an execution unit when processing the unaligned load instruction; a buffer storage element for temporarily storing partial writeback results retrieved from the memory, a partial writeback result comprising a first part of a processed unaligned load instruction; and a logic controller device associated with the buffer storage element, the logic controller device for tracking the first part of the processed unaligned load and tracking a second part of the unaligned load to be collected at an arbitrary later time, wherein the first part of the load is retrieved from the buffer storage element for merging with the second part of the unaligned load to satisfy the unaligned load instruction.

In one or more aspects, a combiner circuit eventually merges a stored first part of an unaligned load data stored at said buffer storage element with a remaining second part of that unaligned load retrieved from the memory.

In accordance with a further aspect, there is provided a method for processing information in a processor. The method comprises: providing a processing pipeline having one or more execution units for processing unaligned load instructions, the execution units having an associated memory for storing data used by the execution unit when processing an unaligned load instruction; temporarily storing, at a buffer storage element associated with the execution unit, partial writeback results retrieved from the memory, a partial writeback result comprising a first part of a processed unaligned load instruction; and tracking, at a logic controller device associated with the buffer storage element, the first part of the processed unaligned load and tracking a second part of the unaligned load to be collected at an arbitrary later time, wherein the first part of the load is retrieved from the buffer storage element for merging with the second part of the unaligned load to satisfy the unaligned load instruction.

The foregoing and other objects, features, and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of a computer system, computer architectural structure, processor, processor architectural structure, processor pipelines, execution units, and/or their method of operation will be better understood when read in conjunction with the figures provided. Embodiments are provided in the figures for the purpose of illustrating aspects, features, and/or various embodiments of the computer system, computer architectural structure, processor, processor architectural structure, processor pipelines, execution units, and their method of operation, but the claims should not be limited to the precise system, embodiments, methods, processes and/or devices shown, and the features, and/or processes shown may be used singularly or in combination with other features, and/or processes.

DETAILED DESCRIPTION

Figure 1:
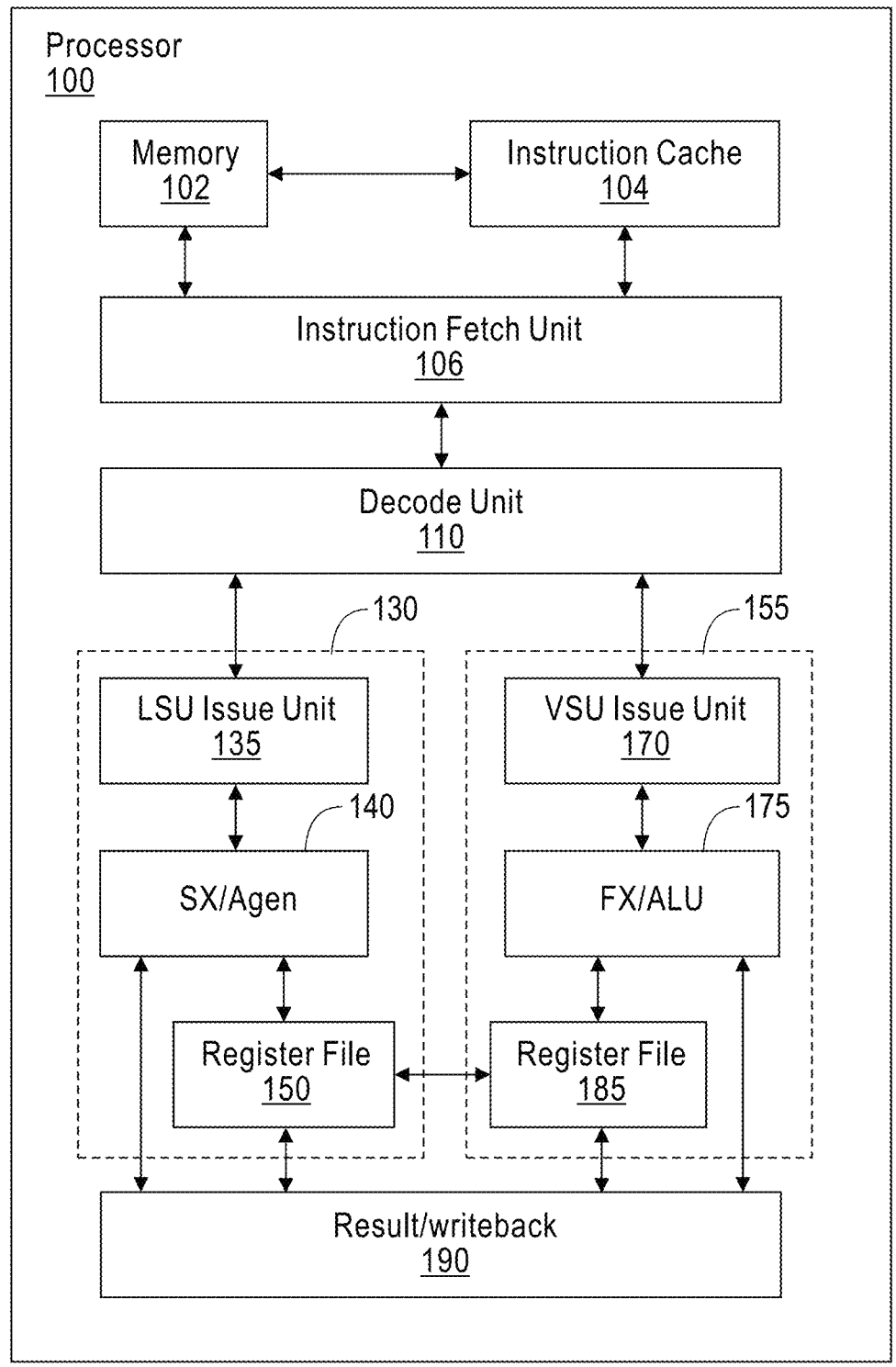
FIG. 1 illustrates a simplified block diagram of a processor in which certain aspects of the present disclosure may be practiced.

The following description is made for illustrating the general principles of the invention and is not meant to limit the inventive concepts claimed herein. In the following detailed description, numerous details are set forth in order to provide an understanding of the computer system, computer architectural structure, processor, processor architectural structure, processor instruction execution pipelines, execution units, and their method of operation, however, it will be understood by those skilled in the art that different and numerous embodiments of the computer system, computer architectural structure, processor, processor architectural structure, processor instruction execution pipelines, execution units, and their method of operation may be practiced without those specific details, and the claims and invention should not be limited to the system, assemblies, subassemblies, embodiments, functional units, features, circuitry, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and processor architecture, which are apparent to those skilled in the art. It is assumed that those skilled in the art are familiar with the general architecture of processors, and, in particular, with processors having execution pipelines and one or more execution units. It may be noted that a numbered element is numbered according to the figure in which the element is introduced, and is often, but not always, referred to by that number in succeeding figures.

In modern computer architecture, there are several known ways to design a computer adapted to perform more than one instruction at a time, or at least in the same time frame. For example, one design to improve throughput includes multiple execution slices within a processor core to process multiple instruction threads at the same time, with the threads sharing certain resources of the processor core. An execution slice may refer to multiple data processing hardware pipelines connected in parallel within a processor to process multiple instructions concurrently. Pipelining involves processing instructions in stages, so that a multi-stage pipeline maintains the same throughput as a single stage pipeline on multi-cycle instructions. Multiple execution slices may be used as part of simultaneous multi-threading within a processor core.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. An instruction in the issue queue typically is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units. Register files typically have information read from and/or written to entries or locations in the register file.

FIG. 1 depicts a simplified block diagram of a processor 100 according to an embodiment. The processor 100 includes memory 102, instruction cache 104, instruction fetch unit 106, decode unit 110, an execution slice that includes Load/Storage Unit (LSU) processing pipeline 130 and Vector Scalar Unit (VSU) processing pipeline 155, and result/write back logic 190 to write results of executed instructions to a destination resource. The processor 100 may be included within a computer system or otherwise distributed within a computer system. Instructions and data can be stored in memory 102, and the instruction cache 104 may access instructions in memory 102 and store the instructions to be fetched. The memory 102 may include any type of volatile or nonvolatile memory. The memory 102 and instruction cache 104 can include multiple cache levels.

In FIG. 1, a simplified example of the instruction fetch unit 106, decode unit 110, and execution slice are depicted. In various embodiments, the processor 110 may include multiple processing execution slices, e.g., four execution slices. In an embodiment, each execution slice includes an LSU processing pipeline 130 for handling load and store instructions and a VSU processing pipeline 155 for handling fixed point, floating point, or vector load and store instructions. In an aspect, the LSU processing pipeline 130 includes an LSU issue unit 135, an execution unit 140, and physical register file 150. The execution unit 140 in an embodiment includes Sx/Agen execution pipeline. The LSU processing pipeline 130 may also include other features, such as error checking and handling logic, one or more parallel paths through the LSU processing pipeline 130, and other features now or hereafter known in the art. In an aspect, the VSU processing pipeline 155 includes similar processing units such as including, but not limited to: an VSU issue unit 170, an execution unit 175, and physical register file 185. The execution unit 175 in an embodiment includes an FX/ALU execution pipeline. The VSU processing pipeline 155 may also include other features, such as error checking and handling logic, one or more parallel paths through the VSU processing pipeline 155, and other features now or hereafter known in the art.

In the processor 100 of FIG. 1, the instruction fetch unit 106 fetches instructions from the instruction cache 104 according to an instruction address, for further processing by the decode unit 110. The decode unit 110 decodes instructions and passes the decoded instructions, portions of instructions, or other decoded data to the appropriate pipeline 130 or 155 depending upon the type of instruction. The decode unit 110 may also detect branch instructions. More specifically, in the example of FIG. 1, the decode unit 110 will transmit the decoded instruction to either the LSU Issue Unit 135 or the VSU Issue unit 170. The respective LSU or VSU issue units analyzes the instructions or other data and transmits the decoded instructions, portions of instructions, or other data to either execution units 140, 175 in the pipeline 130, 155 based on the analysis. The respective physical register file 150, 185 holds data for the respective execution units—140, 175. Physical register file 150, 185 can be separate register files where data in one register file can be used by either execution unit 140, 175, and in an embodiment register file 150, 185 can be a single register file. While a forward path through the processor 100 is depicted in FIG. 1, other feedback and signaling paths may be included between elements of the processor 100.

Execution unit 140, 175 perform and execute operations specified by the instructions issued to the respective execution units 140, 175. While LSU pipeline 130 has been shown with SX/Agen execution pipeline, execution unit 140 can include, for example, a plurality of execution units, such as load/store execution units (LSUs), simple units (SXs) that include store address generator (Agen) logic, and/or other execution units. While VSU pipeline 155 has been shown with FX/ALU execution pipeline, execution unit 175 can include, for example, a plurality of execution units, such as fixed-point execution units (FXs), floating-point execution units (FPUs), Arithmetic Logic execution units (ALUs), vector scalar execution units (VSUs), and/or other execution units.

Processor 100 also includes result/write back logic 190 to write the results of executed instructions, e.g., results from LSU processing pipeline 130 and VSU processing pipeline 155, to a destination resource. The destination resource may be any type of resource, including registers, cache memory, other memory, I/O circuitry to communicate with other devices, other processing circuits, or any other type of destination for executed instructions or data. The processor 100 may include other circuits, functional units, and components.

In an embodiment, the present disclosure relates to data storage and data execution circuits and methods for managing the storage of unaligned load/store operations on a memory (e.g., an L1 (Level1 (L1)) D-cache) within a Load-Store Unit (LSU) of a processor core. The execution units 140, 175 in the respective pipelines 130, 155 are responsible for Address-Generation for the Load and Store operations of the LSU and are connected in the LSU through individual data/address buses to exchange load-store related data and metadata. An L1 level cache or lower cache stores results as a result of completing a particular instruction. The data resulting from load and store operations are communicated to/from the LSU via data/address bus lines.

In one particular processor architecture, e.g., International Business Machine Corp.'s Power10 Core, there is implemented "unaligned" loads in two (2) independent passes that are not executed a fixed (time) distance apart, but instead their launches can be arbitrarily spaced apart and get correlated with an instruction tag match. This robust approach improves performance of unaligned loads as well as allows for the most flexibility in scheduling loads accessing memory.

For descriptive albeit non-limiting purposes, an "unaligned" load is any load that crosses a memory boundary. As considered in the IBM Power10 Core microarchitecture, an "unaligned" load is any load that crosses a fixed memory boundary, e.g., the 128 byte cacheline boundary, or a 32 Byte load not word aligned on a word boundary. Such a load will require two (2) separate L1 cache accesses or requests to the memory (e.g., data cache such as an L2 cache memory) to be satisfied. In addition, 32 byte loads that are not word aligned will also require two (2) accesses to be satisfied. Thus, there are two (2) cases that are considered unaligned: 1) the load crosses the 128 byte cacheline boundary, 2) the load is an octword (32B load) that is not word aligned; This is because the memory management system cannot fetch across a word boundary in the data cache so this is broken up into two 16B loads (i.e., 16B loads can handle alignments down to the byte).

Figure 2:
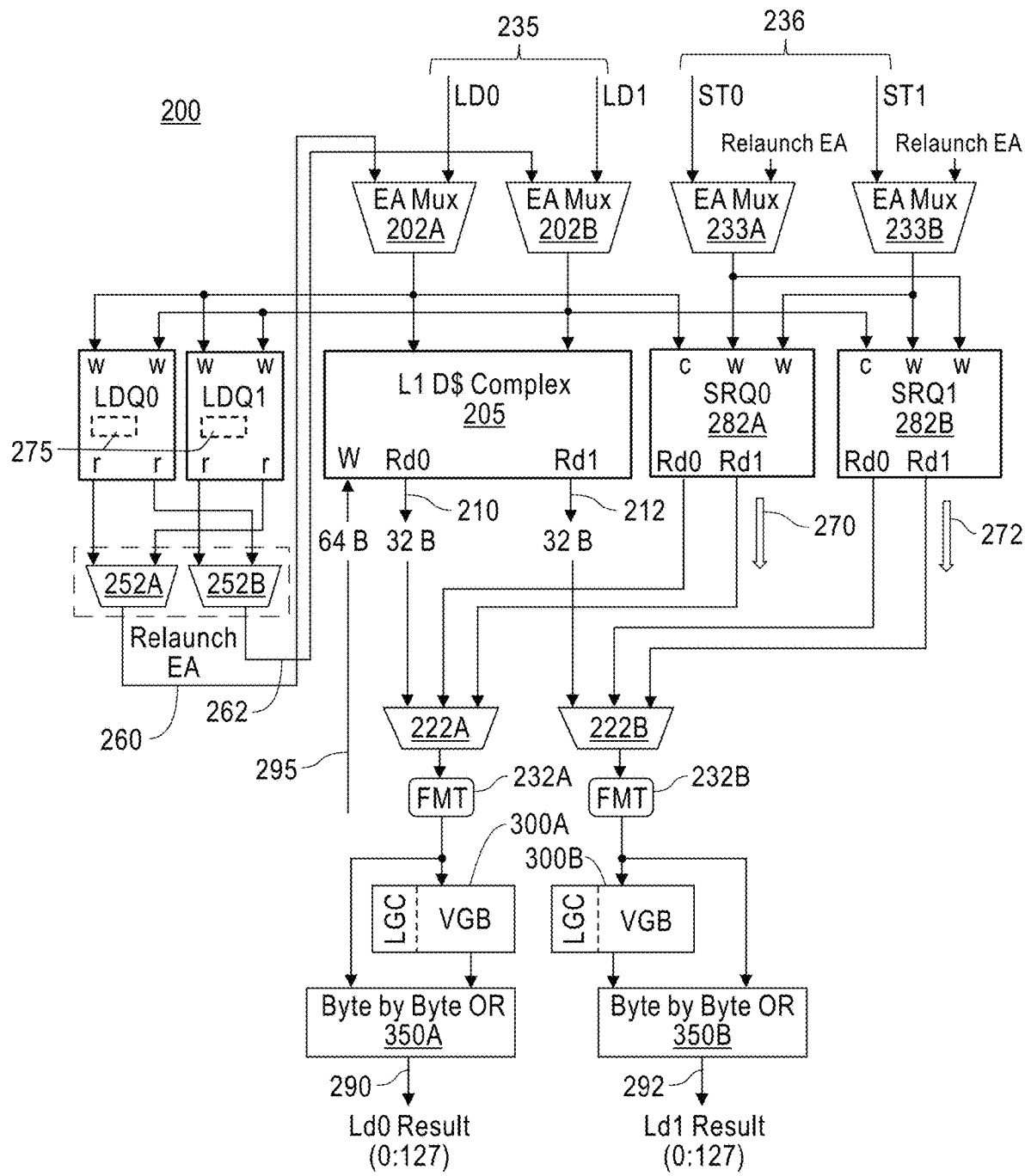
FIG. 2 illustrates a schematic block diagram of a portion of the load store unit (LSU) of the processor in an example embodiment.

FIG. 2 illustrates a schematic block diagram of a portion of the load store unit (LSU) 200 of the processor 100 in an example embodiment. In particular, the LSU 200 depicted in FIG. 2 invokes a processing pipeline that includes load gather buffer operations according to methods herein. It will be appreciated that the LSU 200 of the processor may have other configurations.

Key functional blocks of the load store unit (LSU) 200 of the processor 100 include: a L1 D$ (i.e., "level 1 data cache") memory complex 205 which is a memory storage structure, e.g., a banked D-cache, providing memory read data for LSU unaligned load operations. In an embodiment, the L1 D$ memory complex 205 is a 32-Kbyte, 8-way set associative cache, providing memory read data for each unaligned load access to memory, i.e., a first unaligned load access (referred to herein as "ua_left" load execution portion) and a second unaligned load access (referred to herein as "ua_right" load execution portion). In an embodiment, for load instruction operations, load storage data 235 depicted as data LD0 associated with a first load port 0, and data LD1 associated with second load port 1, are received at EA multiplexors 202A, 202B respectively for storage at the L1 D$ memory complex 205. A majority of the loads provide the data out of the L1 D$ memory complex 205. For a load operation, up to 32 Bytes of data are fed from a respective read port Rd0, Rd1 to a respective multiplexor 222A, 222B via a respective data forwarding path 210, 212 corresponding to a respective LS port processing. The data read out of the L1 D$ memory complex 205 via respective data flow paths 210, 212 are formatted by respective data formatter blocks 232A, 232B. In an embodiment, each formatter (FMT) block 232A, 232B will receive a memory aligned access and align (byte rotate) it to a load result sent to the LSU/VSU. For a load that is performing ua_left execution, the FMT block 232A, 232B will further zero out all bytes that will be provided by the ua_Right access before writing data into a Vector Gather Buffer (VGB). For a load that is performing ua_Right execution, the FMT block will further zero out all bytes that were already provided with the ua_left execution and are already in the VGB such that the final total result delivered to the LSU/VSU once both phases ua_left and ua_right are executed, is a byte by byte OR of data read from VGB and the ua_Right data.

As further shown in FIG. 2, LDQ0, LDQ1 blocks depict memory storage queues and are holding places for loads that have not yet received their data and need to relaunch. These LDQ0, LDQ1 queues hold information for each load such as its identifier (itag), its effective address (EA), and various other flags that are associated with the load. One usage of the LDQs are when the VGB buffer is full and cannot accept the unaligned load. Since this unaligned load has not received data yet and needs to relaunch, it will occupy an entry in the LDQ until it can execute. LDQ0, LDQ1 queues each can include a plurality of entries, e.g., 64 entries, each entry holding one load instruction. For unaligned loads, one LDQ entry will hold both the ua_left and ua_right portion of the load. Each respective LDQ0, LDQ1 queue provides respective relaunch instruction information, e.g., including an EA, and forwards this instruction information via relaunch load forwarding paths 260, 262 and respective multiplexor devices 252A, 252B to provide memory the instruction information (which will include the EA) for an unaligned load access, i.e., ua_left and ua_right access to memory when the VGB buffer becomes available. Relaunched EA addresses stored at the LDQ0, LDQ1 are forwarded via a respective path 260, 262 for receipt at EA muxes 202A, 202B respectively and eventual storage at the L1 D$ memory complex 205. Each respective LDQ0, LDQ1 block includes a Load Launch Queue (LLQ) 275 for controlling the relaunch operations, and in particular, for tracking the unaligned load execution state (ua_left, ua_right) for each unaligned load that is currently executing in the LSU 200. The LLQ will initiate ua_right execution of a load once ua_left is done and has written into the VGB.

As further shown in FIG. 2, store reorder queues SRQ0 282A and SRQ1 282B depict further memory storage devices to load entries, e.g., 36 entries, and each queue provides an alternate store to load forwarding path for a load-storage (LS) slice that can provide memory read data for each unaligned load access, i.e., ua_left and ua_right access to memory. In an embodiment, for store instruction operations, storage addresses 236 depicted as data ST0 and data ST1 associated with a respective first load port 0 and second load port 1 are received at EA muxes 233A, 233B respectively for storage at the L1 D$ memory complex 205. A majority of the loads provide the data out of the L1 D$ memory complex 205. However, an alternate store to load forwarding path is a path 270, 272 in the dataflow where a load operation can obtain data from a store queue (SRQ0, SRQ1) instead of the L1 data cache for the case where a store is in the SRQ and has the same address as the load and the store is older than the load. For example, as loads are issued into a LS-slice pipeline, each SRQ0 (or SRQ1) entry is checked for older stores on which they are dependent (i.e., for stores with overlapping address ranges). When a store with an overlapping effective address is found, the load is identified as a candidate for store-forwarding, allowing store forwarding to take place.

Thus, in an embodiment, the load result reflects the store data. The store will eventually write the L1, but instead of waiting to do so, the load will read data directly from the store queue SRQ0 or SRQ1. Most loads do not take this path 270,272 and will normally hit out of the L1 D$ memory complex 205. All logic related to unaligned load handling behaves identically, regardless of whether the data happened to be coming from the SRQ or the L1 D$ memory complex 205.

As further shown in FIG. 2, the L1 D$ memory complex 205 is configurable to receive reload data 295 (e.g., up to (64B per cycle) from a second level (L2) cache or a lower cache memory when executing ua_left and/or ua_right unaligned loads.

In an embodiment of the present disclosure, a respective load vector gather buffer (VGB) unit and a respective corresponding load gather controller (LGC) unit, i.e., VGB/LGC instance pairs 300A, 300B, are the main structures provided to handle unaligned loads in the LSU unit 200. A first VGB/LGC instance 300A is for a first load port 0 (LD0/SFX0 (VGB0)), and the other instance 300B is for load port 1 (LD1/SFX1 (VGB1)). Each VGB/LGC instance includes a plurality of unaligned load storage entries for storing partial writeback results of executed unaligned loads, each entry for storing a predetermined number of bytes.

Associated with a respective VGB/LGC instance pair 300A, 300B, is a corresponding OR element 350A, 350B for combining data bytes, i.e., partial writeback results, read out from a VGB entry in byte by byte fashion. That is, OR elements 350A, 350B generate the corresponding result load, e.g., 32 Bytes providing a respective LD0 Result(0:127) 290 or LD1 Result(0:127) 292 to the LSU. Such elements can also provide a SFX0 Result(0:127) to vector scalar unit (VSU) processing.

Figure 3:
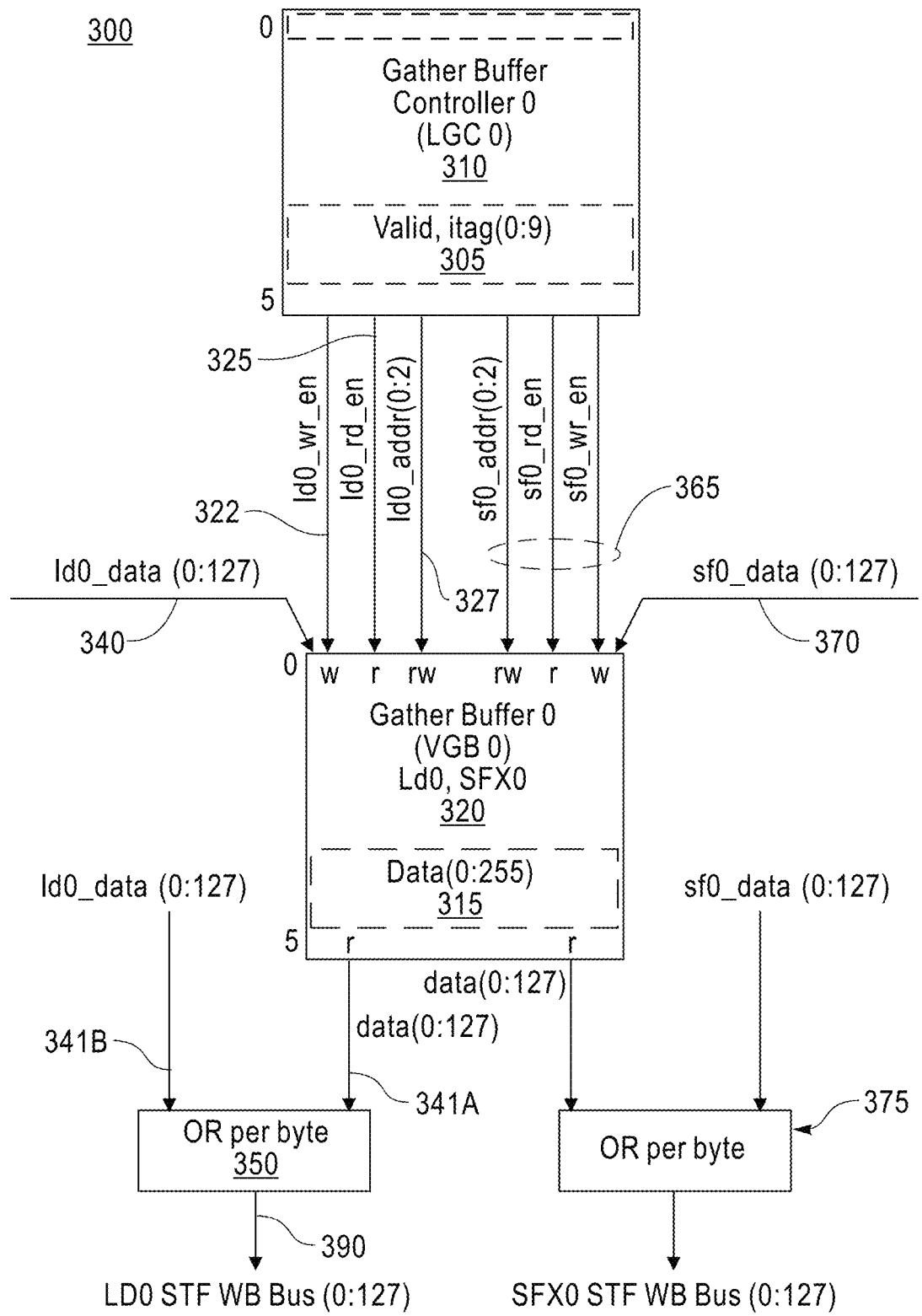
FIG. 3 shows an exemplary block diagram of a VGB memory storage and corresponding LGC apparatus.

FIG. 3 shows an exemplary block diagram of a buffer apparatus 300 including a vector gather buffer (VGB) memory storage device 320 and corresponding LGC controller circuit 310. In an embodiment, the LGC controller 310 contains entries 305 for storing addresses identifying an unaligned load operation detected by the LSU. A partial unaligned load result is obtained and stored in a corresponding entry 315 in the VGB gather buffer storage device 320. In an example non-limiting embodiment, the LGC 310 and VGB buffer 320 each contain six (6) entries (labeled entry 0 to entry 5) in one-to-one correspondence with each other, with each VGB buffer entry 315 for temporarily storing up to 32 Bytes of data (e.g., data(0:255)).

Each vector gather buffer entry 315 is to store received unaligned load data in an instance when: 1) the stored load data crosses the 128-byte cacheline boundary; or 2) the load is an octword (32B load) that is not word aligned. The gather buffer mechanism is also configurable for use in an additional scenario, e.g., a load crossing the 32B sector boundary when the data cache is disabled or in other forward progress problems dealing with CDF (critical data forwarding) from the L2 cache (not shown).

For a dual core processor, e.g., Power10, the vector gather buffer 320 is provided that is able to hold up to six (6) unaligned loads and the corresponding LGC circuit 310 tracks the two halves of it from launch until finish. At LSU "agen" (address generation) launch time, a logic circuit run at the LSU executes logic to detect whether a load is considered to be "unaligned" by examining an address and the load data size.

The VGB 320 collects partial writeback results from the LSU unit on loads that require multiple memory accesses from the L1 D$ memory complex 205 or a lower level of memory. When the final memory access is sent to satisfy the load, the LSU will generate and send a "data_valid" signal and "finish" for the load and the final writeback will be merged with partial writeback data stored in the gather buffer to write a full vector register or general purpose register in the register file.

Each Load Gather Controller (LGC) circuit 310 which correspond to a respective VGB 320, tracks the two parts of an unaligned load and controls the reading and writing of the VGBs. In particular, in response to executing a first unaligned load operation (e.g., ua_left unaligned load process), the LGC will control the writing of a partial writeback result to a VGB entry by asserting a ld0_wr_en signal 322 and a corresponding VGB entry address 327 (e.g., address ld0_addr(0:2)) to the VGB to control the writing of a partial unaligned load data result, e.g., ld0_data(0:127) result (up to 16-Bytes) received from the memory to the VGB entry 315 associated with that VGB entry address. The partial writeback results of a first unaligned load execution are sent via a data bus 340 for receipt at an available VGB entry 315. Further, the LGC will control the reading of a partial writeback result stored at a VGB entry by asserting a ld0_rd_en signal 325 to the VGB to control the reading of a buffered partial unaligned load data result 341A, e.g., ld0_data(0:127), stored at a VGB entry 315.

As an example: in response to an instruction for performing a 32 Byte load, the effective address and size of the load is analyzed by an LSU logic circuit to first determine if the load request is for an unaligned load. For example, a 32-Byte load is unaligned when a starting address issued to LD0 is at byte location 125 (i.e., of a 128B line). A first unaligned access, e.g., ua_left access, would collect memory bytes 125-127, (i.e., 3 bytes) that align to the 128-byte boundary and these 3 databytes are a partial writeback result stored in a VGB entry 315. A corresponding identifier tag, e.g., such as part of an effective address of the unaligned load, is stored in the LGC entry corresponding to the stored partial writeback result and is used to identify the VGB entry storing the partial writeback load result. The remaining unaligned load memory access, e.g., ua_right unaligned load access, would collect remaining memory bytes 128-156, (i.e., 29 bytes) (i.e., bytes 0-28 on the next 128B cacheline in the processor) that are stored at a location aligned with the 128-byte boundary to satisfy the load.

As shown in FIG. 3, upon finishing execution of the ua_right unaligned load access, the collected remaining memory bytes 341B (e.g., 29 bytes) are merged with the initial bytes 341A stored as a result of the initial ua_left unaligned load processing (e.g., 3 bytes) that are read out from the VGB 320. Merging of ua_left and ua_right unaligned load processing results is performed on a byte by byte basis using logical OR element 350 and the final merged 32-byte result satisfying the unaligned load request is forwarded on the writeback bus 390, e.g., labeled LD0 STF Bus(0:127) for subsequent register storage/use.

In further view of FIG. 3, the LGC/VGB structure 300 is additionally capable of handling special type of loads, e.g., loads of 16 Bytes or less, retrieved from another 16-Byte data bus 370 labeled sf0_data(0:127). The same functionality is performed for buffering these special type loads that require two load accesses. Thus, additional read enable, write enable and LGC/VGB entry address lines 365 and additional OR gate processing 375 for merging, byte by byte, ua_left and ua_right load portions are provided to invoke identical load processing functionality for these types of loads for reading at the writeback bus SF X0 STF WB Bus(0:127). Additional data paths could be added by simply adding read/write ports.

Figure 4:
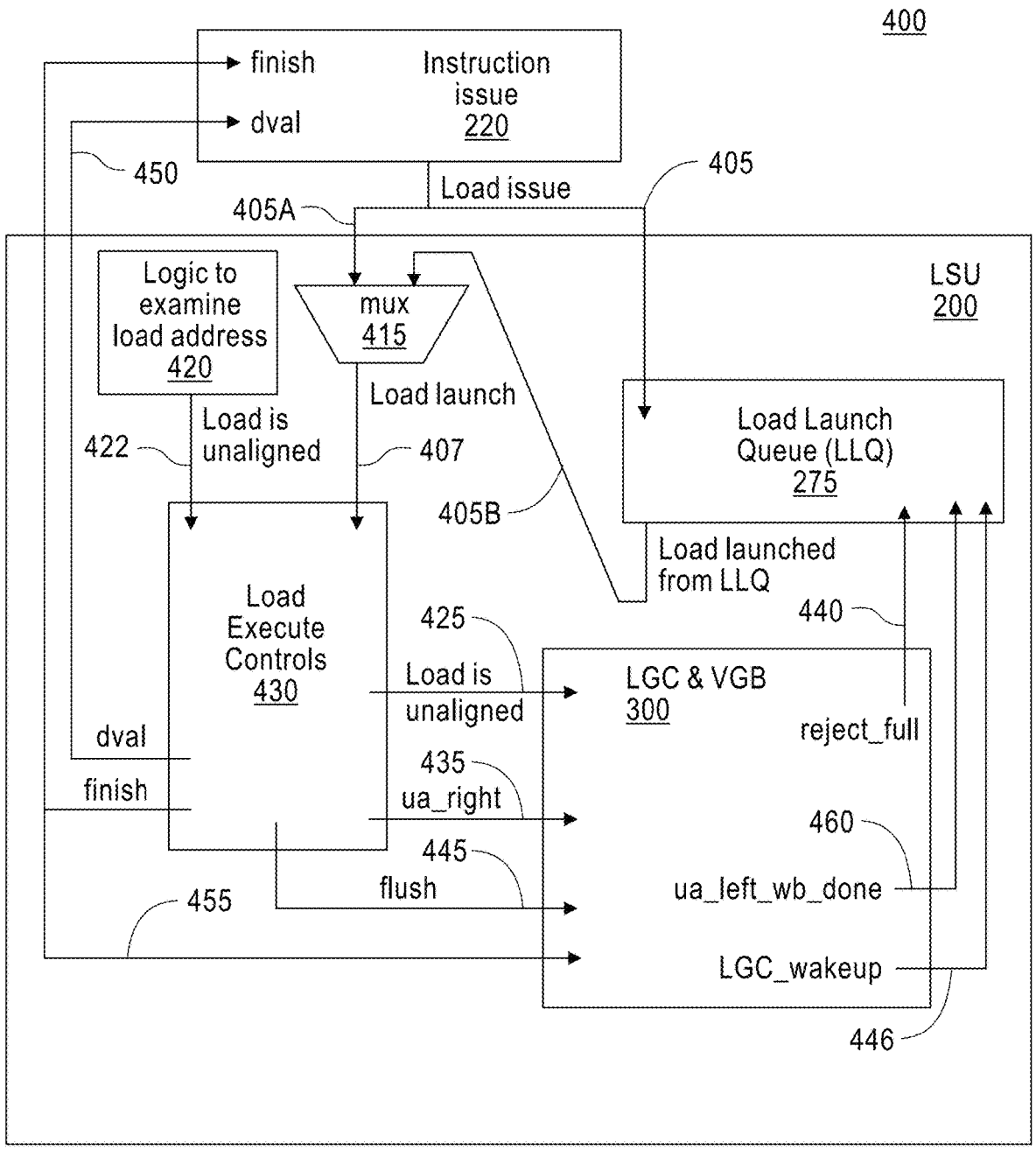
FIG. 4 depicts a further schematic of LSU components associated with processing unaligned loads using the LGB/VGB pair of FIG. 3.

FIG. 4 depicts a further schematic 400 of LSU components associated with processing unaligned loads using the LGC/VGB apparatus 300 of FIG. 3. As shown in FIG. 4, the Instruction Dispatch or Issue Unit (ISU) 220 (which is part of the processor core, not part of the LSU) launches a load instruction 405 to the LSU 200 where it is received at the Load Launch Queue (LLQ) storage circuitry 275. In an embodiment, the ISU decides whether to issue instructions to either the LSU or the VSU. In response to a load 405 issued to the LSU, the LSU allocates a new entry into the Load Launch Queue (LLQ) 275. There are enough entries in the LLQ to hold all the loads the ISU 220 is able to launch. The LLQ 275 is responsible for tracking all load instructions from issue to finish. The LLQ circuit 275 further implements logic for relaunching loads that did not yet receive data.

The LLQ circuit logic 275 will decide which load instruction 407 actually gets launched down the LSU processing pipeline: it can be the load that just issued 405A, or it could be any load 405B in the LLQ 275 that is ready to attempt to receive its data. In an embodiment, LLQ logic controls a multiplexor element 415 to forward the load instruction 407 that actually gets launched down the LSU processing pipeline. By controlling multiplexor 415, when a load gets launched down an LSU processing pipeline (e.g., pipeline associated with LD0 or LD1), there is also launched all associated flags that identify that load or qualify it in some way. In an embodiment, an LSU logic circuit 420 is initially invoked to examine the load address launched and determine if the load is unaligned (e.g., crosses a cacheline boundary in the L1 D$ cache). If the load is determined as unaligned, a load unaligned signal 422 is asserted for the current load issue 407.

An additional component in the LSU 200 is the Load Execute Controls control macro 430 which is the main load pipeline control macro that functions to pipe the load down with its associated flags and send it off to the various parts of the LSU that need to work to handle it.

For LSU vector gather buffer management operations, there are such associated flags including: an itag flag which is a unique instruction tag to identify the load, a us_left unaligned flag signal 425 if the load is unaligned, an indication if the load is ua_right 435, or a signal 445 to initiate a flush operation for clearing content of all entries in the LGC/VGB 300. In an embodiment, the load is unaligned signal 422 is the us_left signal and is computed and known very early in the pipeline (e.g., right after address generation) and then the Load Execute Controls control macro 430 pipes that signal down the pipeline with the load it goes with (just like it was one of the associated flags with that load) and then at the appropriate time sends that signal 425 over to the LGC logic where it will use that indication to treat the load as a ua_left. Otherwise, the Load Execute Controls control macro 430 forwards the load instruction to a lower level cache and a corresponding directory (not shown) for data lookup, or for processing a miss queue if the load cannot find its data in the cache, or is forwarded to various other macros for processing. In an embodiment, the us_left unaligned flag signal 425 is forwarded to the Load Gather Controls (LGC) controller 310 if the load is unaligned and in response, the LGC/VGB pair 300 interact to obtain/store the first data portion of the unaligned load.

In an embodiment, the LGC circuit logic is invoked to first determine whether there is an available entry in the entry LGC/VGB to hold this new unaligned load data. If there is not space available to hold this new load, then the LGC generates and asserts a "reject_full" signal 440 which instructs the LLQ 275 to put the load back to sleep until a later time when there is space available in the LGC and at that time the LGC will wake up the load to relaunch the load as launch 405B. If there is an entry available in the LGC/VGB then the LGC begins processing the load (called ua_left). Once this ua_left receives data (either from the L1 data cache complex or from lower level memory) then the Load Execute Controls macro 430 which is monitoring all aspects of this load as it executes in the load pipeline will know that this is a ua_left that has returned data.

Once all the data is collected for the ua_left load portion of the load and stored at the VGB entry, the LGC communicates this to the LLQ 275 by asserting a "ua_left_wb_done" signal 460 which indicates that the ua_left data writeback is complete and it is time to wake up the load and relaunch the same load again but this time setting the ua_right execution flag 435. In an embodiment, the relaunching also includes adjusting the EA address of the load (e.g., adding +32 to the address) so that the ua_right load begins at the start of the next 32B sector (which may also be the new cacheline if this type of unalign was a cacheline cross). The indication if the load is ua_right 435 is forwarded to the LGC controller of the LGC/VGB pair 300. If the ua_right flag 435 is set for this load, that is all that is needed to know that this load needs to be sent to the LGC logic. The ua_right load will not appear to be unaligned at this point since its start address has been adjusted to begin at the 32B boundary. If the LGC receives indication 425 that the load in the launch pipe has its ua_right flag 435 set, then the LGC logic begins its work to handle this load.

Two additional signals asserted by the Load Execute Controls control macro 430 include the "data_valid" (dval) signal 450 which is a signal normally returned to the Instruction Dispatch Unit 135 for any aligned load that returns data. Until all the data has been received to satisfy an unaligned load, Load Execute Controls control macro 430 will not assert dval signal 450. That is, the Load Execute Controls control macro 430 will not turn on the dval signal 450 (for a ua_left load) to the Instruction issue unit 135 as it normally would for any other load that returns data since all the data needed to satisfy this load has not been obtained. Once both the ua_left and ua_right portions of the current load is finished executing, the Load Execute Controls control macro 430 will send a "finish" signal 455 to the Instruction Issue unit 135 indicating that the current load is finished executing. The finish signal 455 is also be sent to the LGC so it knows it is time to remove that load entry from the LGC.

Figure 5A:
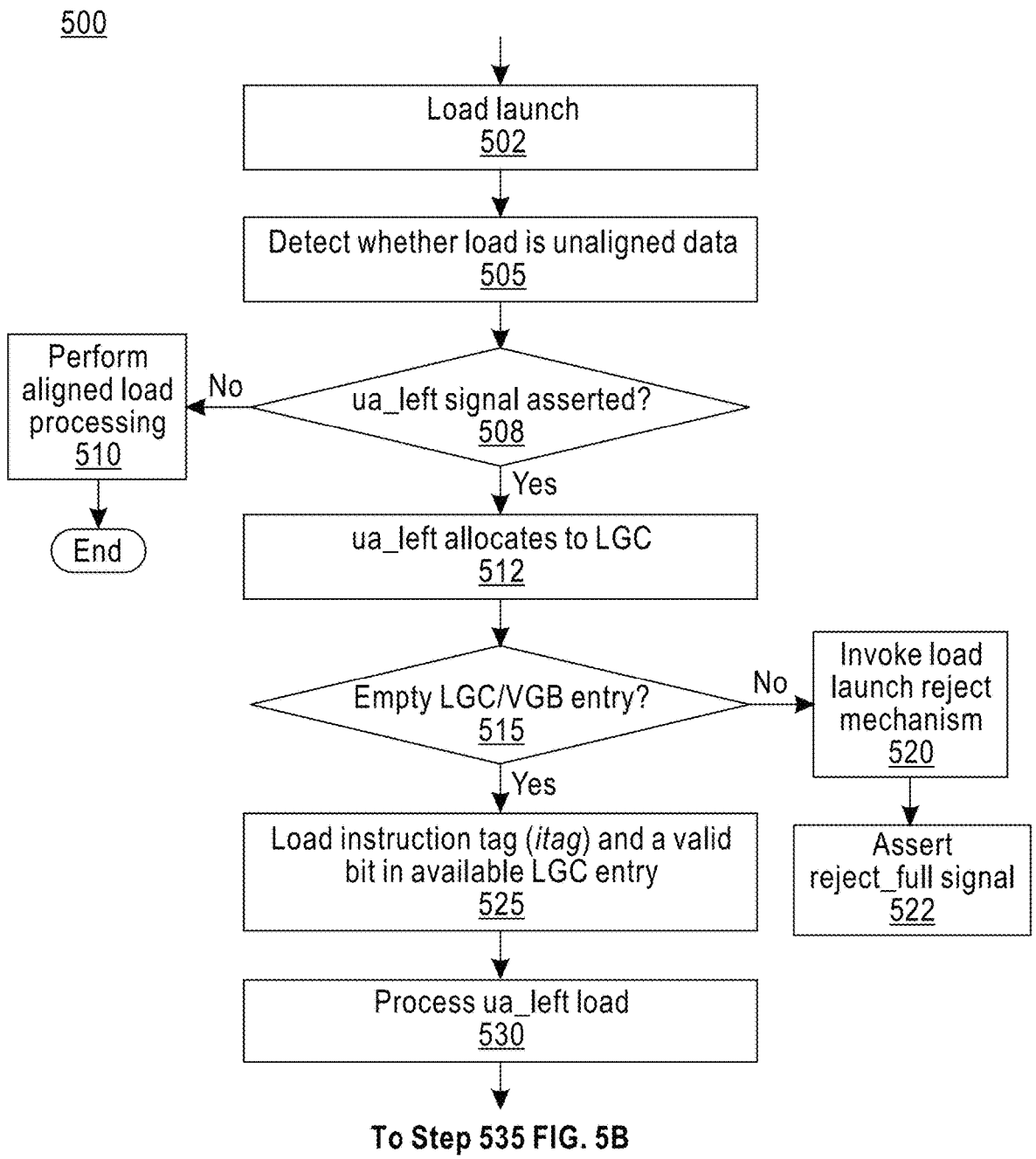
FIGS. 5A-5C illustrate a flow chart of a method according to an embodiment for processing unaligned loads using a gather buffer in the LSU of a processor.
Figure 5B:
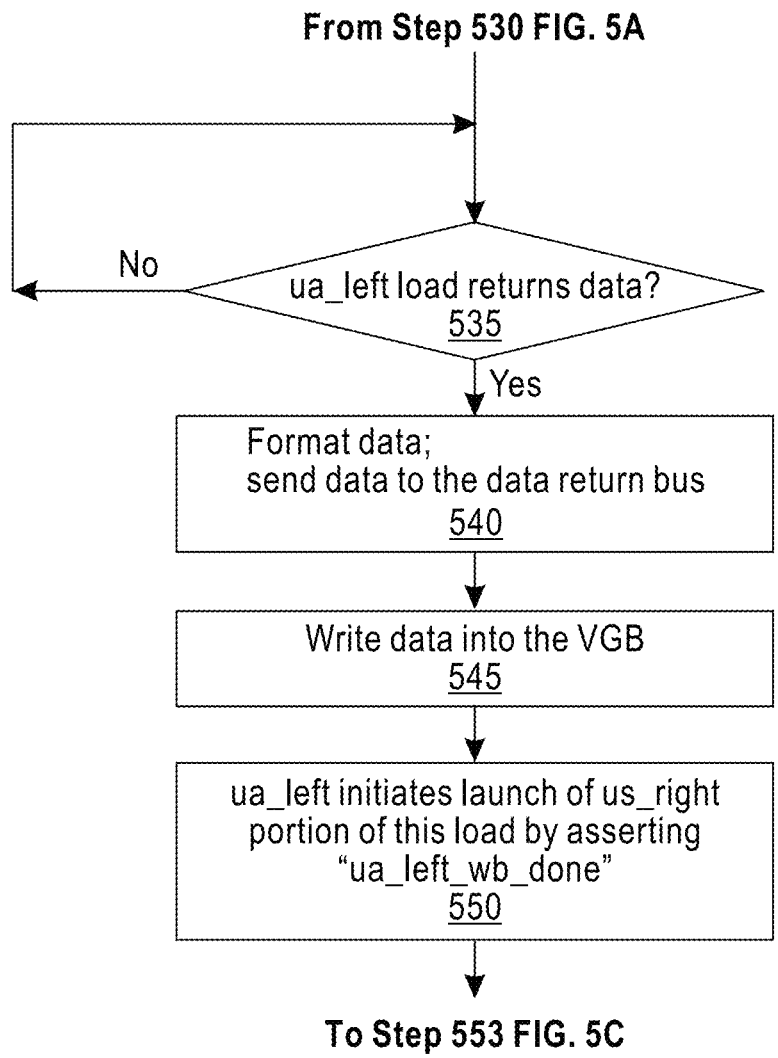
Figure 5C:
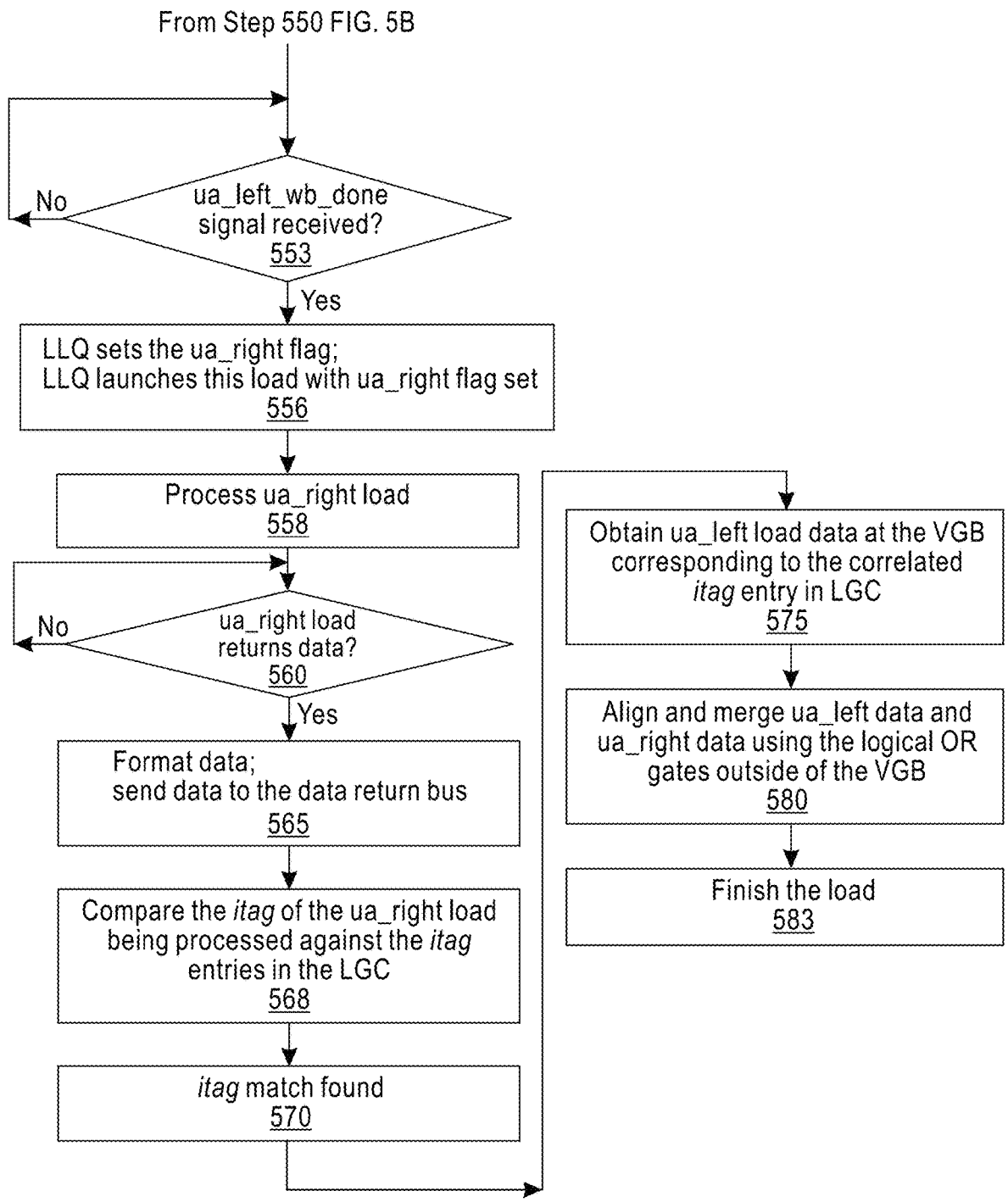

FIGS. 5A-5C depict a flow diagram of a method 500 for operating a data gather buffer (VGB) for unaligned load operations as a two-stage process. Initially, a load instruction is launched, i.e., the ISU 220 launches a load instruction to the LSU at 502. Then, at address generation (agen) time 505, the LSU logic 420 examining load addresses detects on the fly whether the load is unaligned. In an embodiment, at 505, the LSU logic element 420 determines an unaligned load based on its effective address (EA) start in memory and its load size (length of data being accessed) and whether the load crosses a memory boundary, e.g., the 128-byte cacheline boundary, or the load is an octword (32B load) that is not word aligned. If, at 505, it is determined that an unaligned load has issued thus requiring multiple memory accesses, the LSU logic will assert the special "ua_left" signal or flag 425 indicating an unaligned load (e.g., portion up to the cacheline boundary). The asserted ua_left signal is received at Load Execute Controls control macro 430. The Load Execute Controls control macro 430 makes a determination at 508 as to whether the special "ua_left" signal 425 has issued for the current load issued. If a special "ua_left" signal 425 has not issued, the current load instruction is for an aligned load, and normal LSU pipeline processing of the load instruction for aligned load is performed at 510 as known in the art, and the process ends for that load instruction. Otherwise, at 508, if a special "ua_left" signal 425 has issued with the corresponding load, the process continues to 512 where Load Execute Controls controls macro 430, in response to receipt of ua_left signal, allocates a storage at the LGC controller structure. In an embodiment, Load Execute Controls control macro 430 running at the LSU asserts a "load_is_unaligned" signal 422 indicating a request to buffer a first part of the unaligned load received from the memory. Ultimately the "load_is_unaligned" signal becomes the ua_left signal, but at address generation time the unit that detects that the load is unaligned simply calls it "unaligned" and passes the load off to the LGC. The LGC logic then renames this signal as "ua_left".

The LGC (and thus the VGB) receives this gather buffer request. Continuing at 515, a determination is made as to whether the LGC (and the VGB) has an available entry, or otherwise have all LGC/VGB buffer entries occupied. If all buffer entries are occupied or full, the LGC invokes a reject mechanism at 520 that will reject the load launch and allow it to wake up and launch again once an entry becomes available. In particular, at 522, the LGC asserts a reject_full signal 440 which tells the LLQ to put the load back to sleep until a later time there is an entry available in the LGC and at that time the LGC will wake up the load to relaunch. An embodiment of the LGC reject mechanism is explained in greater detail with respect to the method depicted in FIG. 6 in connection with processing at the LLQ 275. Otherwise, if it is determined at 515 that the LGC (and the VGB) has an available entry, the process proceeds to 525 where the unaligned load is processed. In an embodiment, at 525, the ua_left saves off a 10 bit instruction tag (itag(0:9)) and a valid bit in one of the LGC entries. The LLQ can use the stored itag for tracking a load instruction from issue to finish.

Continuing to 530, FIG. 5A, the ua_left load is then processed to obtain data (either from L1 D$ complex or lower level of memory) to satisfy the initial part of the unaligned load. Continuing to 535, FIG. 5B, a determination is made as to whether partial writeback results have been obtained, i.e., the system waits until a ua_left load returns partial writeback result data (e.g., either from a Dcache access or from lower levels of the memory hierarchy). Once the ua_left load data is returned, at 540, the partial writeback data is formatted and sent via a return bus to the VGB 320 for storage at the corresponding available entry 315 in the VGB configured to collect partial writeback results from the LSU unit on loads that require multiple memory accesses. As an example, the portion of the ua_left load received from memory is received at the VGB via ld0_data(0:127) bits bus 340 for this first part of the unaligned load operation. At 545, FIG. 5B, the LGC will control the writing of a partial writeback result to a VGB entry by asserting a ld0_wr_en signal 322 to the VGB entry to control the writing of a partial unaligned load data result from the data bus, e.g., ld0_data (0:127) results (up to 16 Bytes) received from the memory. The Load Execute Controls controls macro 430 will prevent asserting the dval signal since only partial writeback results have been received. Once the ua_left unaligned load data has been stored in the VGB entry, then at 550, FIG. 5B, the ua_left then sends a special indication to the load launcher to instruct that it is time to launch the other portion of this load, the ua_right. In particular, the load execute controls macro 530 sends a "ua_left_wb_done" signal request to the LLQ 275 to launch the "ua_right" in the second phase of unaligned load processing.

FIG. 5C depicts the overall method implemented at the LLQ 275 for processing any load that the LSU has data returned for, but not all the data needed to satisfy this load, i.e., a load for which the LGC 310 has asserted the "ua_left_wb_done" signal indicating the receipt and VGB storage of ua_left unaligned load data portion. The LLQ, at 553, FIG. 5C, performs a step of determining whether the ua_left_wb_done signal has been asserted by the LGC. Once it is detected that the ua_left_wb_done signal has been asserted from the LGC, then at 556, the LLQ sets a "ua_right" flag for this load and the LLQ will launch this ua_right load down the pipeline with the ua_right flag set such that the LSU processing pipeline can process the remaining portion of that unaligned load as indicated at 558. Thus, it is the case that ua_left and ua_right are two independent launches containing the two pieces of the load data and can be performed at arbitrarily spaced apart times. With respect to launching of the ua_right load down the processing pipeline, in an embodiment, the same load is launched again however with its address adjusted, i.e., adjusted so the address is not at the same spot as the ua_left load portion. In this second phase, for example, the address is adjusted to the 32 byte boundary, e.g., next cacheline. Thus, in an embodiment 32 bytes are added to the effective address (EA) to form the ua_right portion to be executed. An adder element would be implemented as part of logic executed before the "logic to examine load address" 420. Every load initially goes through an adder (which is at the very top of the pipeline) to create its EA address. This ua_right is subsequently launched for this load with +32 added to the EA. In an embodiment, the formatter element will see the original EA(59:63) of the operation sent on ua_right relaunches to guide how formatting should be done (in conjunction with the size of the load).

Continuing to 560, FIG. 5C, in the second phase processing of the "ua_right" portion of an unaligned load, a determination is made as to whether the remaining unaligned ua_right load has been processed at the modified EA to obtain the remaining portion of the data (either from L1 D$ or lower level of memory). Once the ua_right load data has been obtained, at 565, it is formatted and sent via a return bus 332 back to the VGB buffer. Then, at 568, a comparison is made at the LGC to compare the itag of the current load being processed (ua_right load portion) against the itag entries stored in the LGC to find its corresponding ua_left data in the LGC/VGB. Once an itag match is found at 570, the method proceeds to 575 to correlate the two portions, i.e., partial writeback result ua_left data and ua_right data, with the itag match.

In an embodiment, at 575, the LGC asserts the ld0_rd_en signal 325 and corresponding LGC/VGB entry address signal 327 corresponding to the entry having that matched itag that is sent to and received by the VGB. In response to receipt of the ld0_rd_en signal 325 and the corresponding LGC/VGB entry address, the data from ua_left is read out of the corresponding VGB buffer entry. This data is then aligned up with the ua_right so that all data can be returned for the load to write the full VSR or GPR result into the STF regfile 150. In an embodiment, at 580, the ua_left and ua_right unaligned and formatted load data portions are combined with the logical OR gates at an output of the VGB. In an embodiment, the reading and writing the gather buffer is performed on a byte granularity. For unaligned loads, each piece of the unaligned load (on each valid byte for that piece) will be formatted and byte aligned with the result bus as if all the data were present. At the conclusion of the ua_right unaligned load processing, the Load Execute Controls control macro 430 will return data_valid signal 450 and additionally assert the finish signal 455 to end processing for this unaligned load instruction.

That is, once the ua_right receives data (either from the L1 data cache or from lower level memory) then the Load Execute Controls control macro 430 which is monitoring all aspects of this load as it executes in the load pipeline will be aware of that and will know that this unaligned load being processed is not a ua_left that has returned data, and thus there is no special handling needed for this load. Thus, the Load Execute Controls control macro 430 will turn on the dval signal to the ISU 135 since all the data needed to satisfy the entire load has been obtained (i.e., ua_left and ua_right data that were combined with the logical OR gates outside of the VGB). Only at this point in time will the Load Execute Controls control macro 430 send a "finish" signal to the ISU indicating this load is finished executing as shown at 583, FIG. 5C. The finish signal will also be sent to the LGC so the LGC can remove that load entry from the LGC.

The processing depicted in FIGS. 5A-5C allows this ua_left and ua_right to be two independent launches containing the two pieces of the load data and can be done at arbitrarily spaced apart times.

Figure 6:
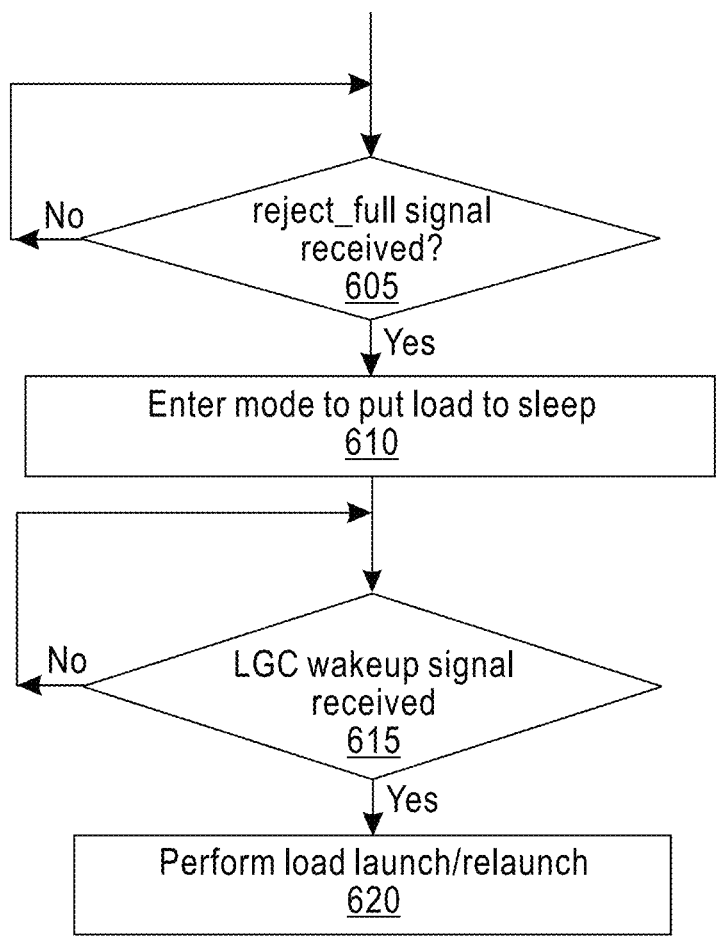
FIG. 6 depicts the method 600 run at the load launch queue for tracking all load instructions from issue to finish and in particular, performing the load launch rejection mechanism in one embodiment.

FIG. 6 depicts the method 600 at the LLQ 275 for tracking all load instructions from issue to finish, and in particular, performs load launch rejection mechanism including the relaunching of unaligned loads that did not yet receive data. A first step 605 depicts the step of determining whether a "reject_full" signal has been received from the LGC when it is discovered that no entry is available in the LGC/VGB for storing a first portion of the unaligned load. In response to receipt of the "reject_full" signal, at 610, the LLQ puts the load to sleep until a later time there is an entry available in the LGC. At such time that there is an entry available in the LGC, the LGC will wake up the load to relaunch. That is, once in the sleep mode, a determination is made at 615 as to whether an LGC wakeup signal 446 has been asserted by the LGC indicating an available entry for storing a part of an unaligned load. If it is determined at 615 that LGC wakeup signal 446 is received, the LLQ will enter an active state and launch a load instruction at 620. In an embodiment, the LLQ logic will decide which load instruction actually gets launched down the LSU pipeline, e.g., it could be a new load 405A that just issued, or it could be a prior load 405B in the LLQ that is ready to attempt to receive its data.

For example, upon awaking from a sleep state, a first ua_left portion of the load could be loaded into the LSU pipeline.

In a further embodiment, the gather buffer (VGBs and associated LGC controllers 300) can augmented to be used to handle load gather instructions. A load gather is an ISA instruction that divides the VSR into 2 or 4 pieces (lanes) such that up to 4 independent loads can be done with each independent load using a different confined bit range of the same VSR. A load gather instruction will have multiple issues and launches but will still have only 1 data_valid and finish. A few additional fields are added to the LGC to support load gather instructions—indication of whether this is gathering 2 or gathering 4 ops, a 4 bit element done field indicating when each element of the load has returned data, and a final gather element sleep field indicating whether the final element should wake up and finish or sleep until the other elements have returned data. In this augmented implementation, some of these fields would be used to communicate between the LGC and VGB for the purposes of writing the various pieces of the load to the VGB properly.

Figure 7:
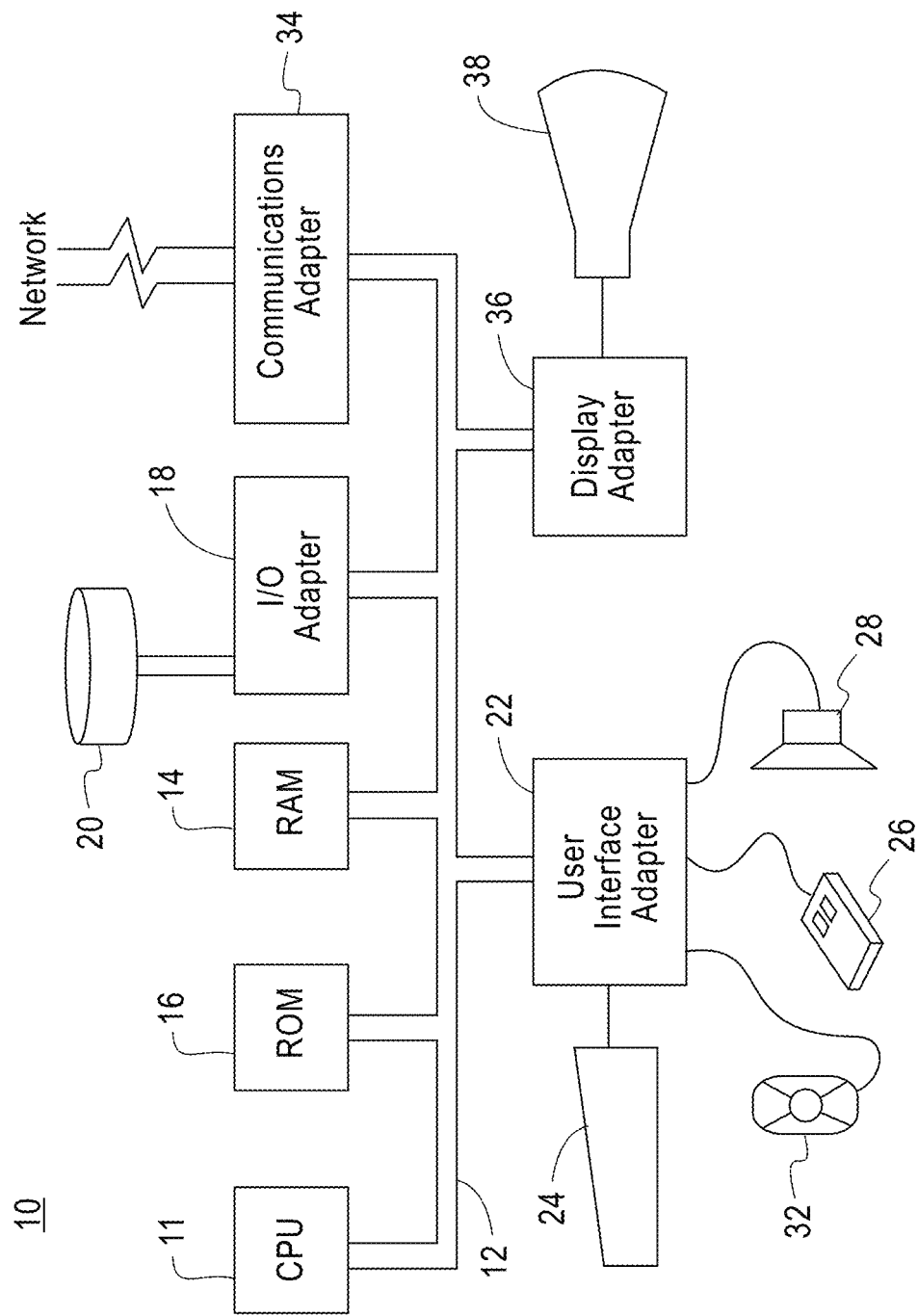
FIG. 7 illustrates an example of a data processing system in which aspects of the present disclosure may be practiced.

FIG. 7 illustrates an example of a data processing system 10 in which aspects of the present disclosure may be practiced. The system has a central processing unit (CPU) 11 also referred to as processor 11. The CPU 11 is coupled to various other components by system bus 12. Read only memory ("ROM") 16 is coupled to the system bus 12 and includes a basic input/output system ("BIOS") that controls certain basic functions of the data processing system 10. Random access memory ("RAM") 14, I/O adapter 18, and communications adapter 34 are also coupled to the system bus 12. I/O adapter 18 may be a small computer system interface ("SCSI") adapter that communicates with a disk storage device 20. Communications adapter 34 interconnects bus 12 with an outside network enabling the data processing system to communicate with other such systems. Input/Output devices are also connected to system bus 12 via user interface adapter 22 and display adapter 36. Keyboard 24, track ball 32, mouse 26, and speaker 28 are all interconnected to bus 12 via user interface adapter 22. Display monitor 38 is connected to system bus 12 by display adapter 36. In this manner, a user is capable of inputting to the system through the keyboard 24, trackball 32 or mouse 26 and receiving output from the system via speaker 28 and display 38. Additionally, an operating system such as, for example, AIX ("AIX" is a trademark of the IBM Corporation) is used to coordinate the functions of the various components shown in FIG. 7.

The CPU (or "processor") 11 includes various registers, buffers, execution units, cache, memories, and other units formed by integrated circuitry, and may operate according to reduced instruction set computing ("RISC") techniques. The CPU 10 processes data according to processor cycles, synchronized, in some aspects, to an internal clock (not shown).

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustrations, can be implemented by special purpose hardware-based computer systems that perform the specified functions or steps, or by combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer system for executing instructions for loading and storing data, the computer system comprising:
a load launch queue receiving and storing a load data instruction issued from an instruction issuing unit;
a first logic circuit configured to examine a load address corresponding to the load data instruction issued from the instruction issuing unit and detect if the load address corresponds to an unaligned load data instruction;
a second logic circuit for processing the issued load data instruction, said processing of the issued load data instruction comprising: generating, in response to detecting the load address corresponds to an unaligned load data instruction, a first unaligned load signal and a second unaligned load signal to track a respective first partial unaligned load data result stored in a memory and second partial unaligned load data result stored in the memory;
a gather buffer comprising a plurality of storage entries storing a plurality of partial unaligned load data results retrieved from the memory;
a gather buffer controller circuit responsive to receiving said first unaligned load signal for retrieving and temporarily storing the first partial unaligned load data result in a storage entry of the gather buffer, said gather buffer controller circuit further responsive to receiving said second unaligned load signal for retrieving from the memory the second partial unaligned load data result for merging with the first partial unaligned load data result stored in the storage entry of said gather buffer at an arbitrary later time to satisfy said unaligned load data instruction; and
a circuit for merging the first partial unaligned load data result stored in the storage entry of said gather buffer with the second partial unaligned load data result retrieved from the memory, wherein said first logic circuit detects whether a load data stored in the memory at the load address is unaligned by examining the load address and a size of the load data stored in the memory at the load address and detecting whether the load data stored in the memory crosses a cache memory line storage boundary thereby requiring multiple memory accesses.

2. The computer system as claimed in claim 1, wherein said gather buffer controller circuit comprises a plurality of storage entries, each respective storage entry in the gather buffer controller circuit in one: one correspondence with a respective storage entry of the plurality of storage entries in the gather buffer, a gather buffer controller circuit storage entry storing an identifier tag associated with an address identifying the unaligned load data instruction, said identifier tag used for tracking the first partial unaligned load data results result and said second partial unaligned load data result.

3. The computer system as claimed in claim 2, wherein said gather buffer controller circuit compares an identifier tag associated with the second partial unaligned load data result retrieved from memory with respective identifier tags stored at the respective storage entries in said gather buffer controller circuit; and in response to finding a matching identifier tag, said gather buffer controller circuit asserting a signal to read the first partial unaligned load data result stored in the storage entry of said gather buffer and merge the first partial unaligned load data result with the second partial unaligned load data result.

4. The computer system as claimed in claim 2, further comprising: said gather buffer controller circuit asserting a corresponding completion signal to the load launch queue indicating the first partial unaligned load data result has been stored in the storage entry of the gather buffer, said load launch queue responsive to said corresponding completion signal for relaunching the load data instruction, said second logic circuit generating said second unaligned load signal to track said second partial unaligned load data result stored in the memory.

5. The computer system as claimed in claim 4, wherein said gather buffer controller circuit further detects available storage entries in said gather buffer controller circuit and corresponding storage entries in said gather buffer in response to receiving said first unaligned load signal and asserts a buffer full signal when no storage entries are available for storing partial unaligned load data results at said gather buffer,
said load launch queue responsive to said buffer full signal for storing unprocessed unaligned load data instructions.

6. The computer system as claimed in claim 5, wherein said gather buffer controller circuit further asserts a wakeup signal for receipt at said load launch queue in response to detecting an available storage entry in said gather buffer for storing partial unaligned load data results,
said load launch queue responsive to said wakeup signal for launching an unprocessed unaligned load instruction.

7. The computer system as claimed in claim 2, wherein said second logic circuit generates a further signal to initiate a flush operation for clearing content of the plurality of storage entries in the gather buffer and clearing respective storage entries of the plurality of storage entries in the gather buffer controller circuit.

8. The computer system as claimed in claim 1, further comprising:
a multiplexor element operatively controlled by the load launch queue to forward a launched unprocessed load instruction to said second logic circuit for processing of the launched unprocessed load instruction.

9. The computer system as claimed in claim 1, wherein the first logic circuit alternately forwards the load data instruction to a processing pipeline configured for retrieving a load data upon detecting the load address does not correspond to an unaligned load data instruction.

10. The computer system as claimed in claim 9, further comprising a data bus receiving a merged first partial unaligned load data result and second partial unaligned load data result for output to said processing pipeline.

11. A method for executing instructions for loading and storing data in a computer, the method comprising:
receiving, at a load launch queue, a load data instruction issued from an instruction issuing unit;
examining, by a first logic circuit, a load address corresponding to the load data instruction issued from the instruction issuing unit and detecting if the load address corresponds to an unaligned load data instruction;
in response to detecting the load address corresponds to an unaligned load data instruction, processing, by a second logic circuit, the issued load data instruction, said processing of the issued load data instruction comprising: generating a first unaligned load signal and a second unaligned load signal to track a respective first partial unaligned load data result stored in a memory and second partial unaligned load data result stored in the memory;
storing, at a gather buffer comprising a plurality of storage entries, a plurality of partial unaligned load data results retrieved from the memory;
receiving at a gather buffer controller circuit, said first unaligned load signal and responsive to receiving said first unaligned load signal, said gather buffer controller circuit for retrieving and temporarily storing the first partial unaligned load data result in a storage entry of the gather buffer, said gather buffer controller circuit further responsive to receiving said second unaligned load signal by retrieving from the memory the second partial unaligned load data result for merging with the first partial unaligned load data result stored in the storage entry of said gather buffer at an arbitrary later time to satisfy said unaligned load data instruction; and
merging the first partial unaligned load data result stored at said storage entry of said gather buffer with the second partial unaligned load data result retrieved from the memory, wherein the detecting if the load address corresponds to an unaligned load data instruction comprises:
detecting, by said first logic circuit, whether a load data stored in the memory at the load address is unaligned by examining the load address and a size of the load data stored in the memory at the load address and detecting whether the load data stored in the memory crosses a cache memory line storage boundary thereby requiring multiple memory accesses.

12. The method as claimed in claim 11, wherein said gather buffer controller circuit comprises a plurality of storage entries, each respective storage entry in the gather buffer controller circuit in one: one correspondence with a respective storage entry of the plurality of storage entries in the gather buffer, said method further comprising:
storing, at a storage entry of said gather buffer controller circuit, an identifier tag associated with an address identifying the unaligned load data instruction, said identifier tag used for tracking the first partial unaligned load data result and said second partial unaligned load data result.

13. The method as claimed in claim 12, further comprising:
comparing, by said gather buffer controller circuit, an identifier tag associated with the second partial unaligned load data result retrieved from memory with respective identifier tags stored at the respective storage entries in said gather buffer controller circuit; and
in response to finding a matching identifier tag, asserting, by said gather buffer controller circuit, a signal to read the first partial unaligned load data result stored in the storage entry of said gather buffer and merging the first partial unaligned load data result with the second partial unaligned load data result.

14. The method as claimed in claim 12, further comprising: and
asserting, by said gather buffer controller circuit, a corresponding completion signal to the load launch queue indicating the first partial unaligned load data result has been stored in the storage entry of the gather buffer, said load launch queue responsive to said corresponding completion signal for relaunching the load data instruction, said second logic circuit generating said second unaligned load signal to track said second partial unaligned load data result stored in the memory.

15. The method as claimed in claim 12, further comprising:
generating, by said second logic circuit, a further signal to initiate a flush operation for clearing content of the plurality of storage entries in the gather buffer and clearing respective storage entries of the plurality of storage entries in the gather buffer controller circuit.

16. The method as claimed in claim 12, further comprising:
  detecting, by said gather buffer controller circuit, available storage entries in said gather buffer controller circuit and corresponding storage entries in said gather buffer in response to receiving said first unaligned load signal; and asserting, by said gather buffer controller circuit, a buffer full signal when no storage entries are available for storing partial unaligned load data results at said gather buffer,
  said load launch queue responsive to said buffer full signal for storing unprocessed unaligned load data instructions.

17. The method as claimed in claim 12, further comprising:
  asserting, by said gather buffer controller circuit, a wakeup signal for receipt at said load launch queue in response to detecting an available storage entry in said gather buffer for storing partial unaligned load data results, said load launch queue responsive to said wakeup signal for launching an unprocessed unaligned load instruction.

18. A computer program product comprising:
one or more computer-readable storage media; and
program instructions stored on the one or more computer-readable storage media to perform operations for loading and storing data in a computer, said operations comprising:
  receiving, at a load launch queue, a load data instruction issued from an instruction issuing unit;
  examining, by a first logic circuit, a load address corresponding to the load data instruction issued from the instruction issuing unit and detecting if the load address corresponds to an unaligned load data instruction;
  in response to detecting the load address corresponds to an unaligned load data instruction, processing, by a second logic circuit, the issued load data instruction, said processing of the issued load data instruction comprising: generating a first unaligned load signal and a second unaligned load signal to track a respective first partial unaligned load data result stored in a memory and second partial unaligned load data result stored in the memory;
  storing, at a gather buffer comprising a plurality of storage entries, a plurality of partial unaligned load data results retrieved from the memory;
  receiving at a gather buffer controller circuit, said first unaligned load signal and responsive to receiving said first unaligned load signal, said gather buffer controller circuit for retrieving and temporarily storing the first partial unaligned load data result in a storage entry of the gather buffer, said gather buffer controller circuit further responsive to receiving said second unaligned load signal by retrieving from the memory the second partial unaligned load data result for merging with the first partial unaligned load data result stored in the storage entry of said gather buffer at an arbitrary later time to satisfy said unaligned load data instruction; and
  merging the first partial unaligned load data result stored at said storage entry of said gather buffer with the second partial unaligned load data result retrieved from the memory, wherein the detecting if the load address corresponds to an unaligned load data instruction comprises:
  detecting, by said first logic circuit, whether a load data stored in the memory at the load address is unaligned by examining the load address and a size of the load data stored in the memory at the load address and detecting whether the load data stored in the memory crosses a cache memory line storage boundary thereby requiring multiple memory accesses.

* * * * *